March 2, 1971     K. C. AYERS ET AL     3,567,629
PROCESS AND PLANT FOR TREATING SEWAGE
Filed June 9, 1969
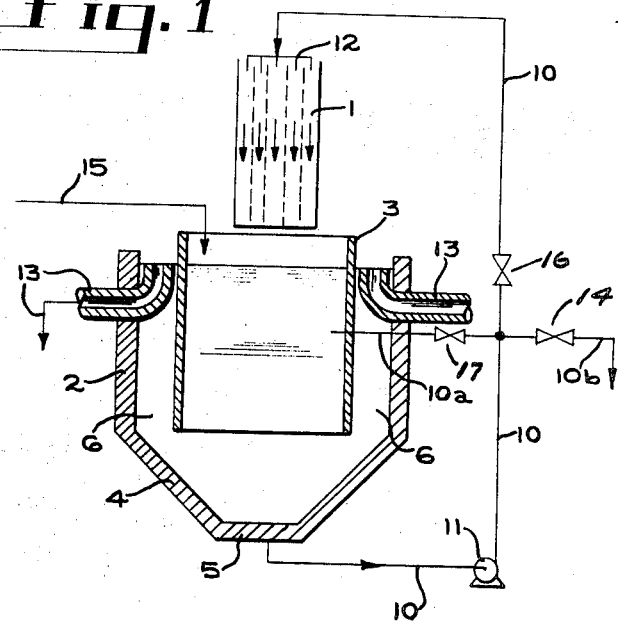
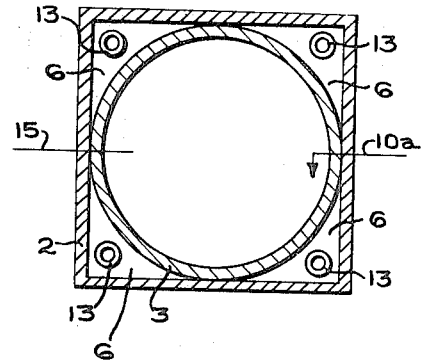
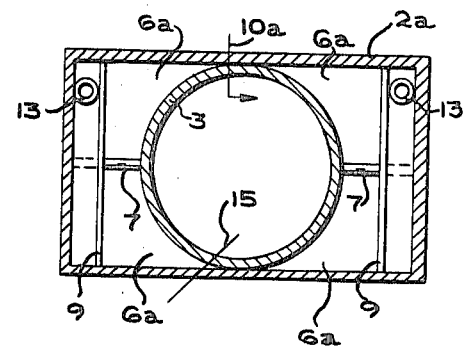
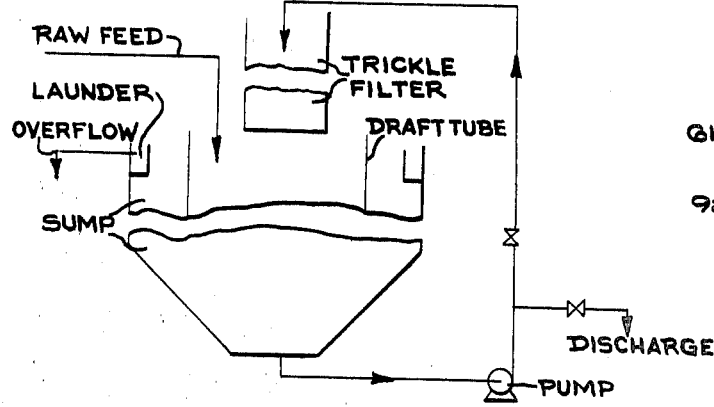
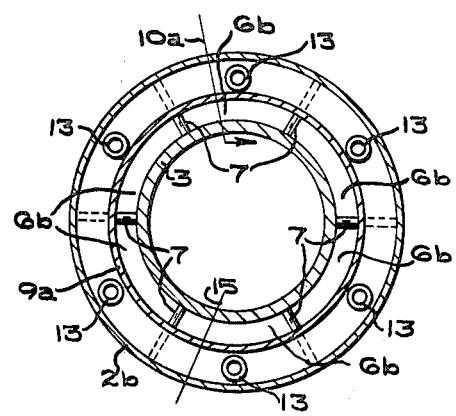
INVENTOR.
KARL C. AYERS
DAVID W. McANANEY United States Patent Office 3,567,629
Patented Mar. 2, 1971

3,567,629
PROCESS AND PLANT FOR TREATING SEWAGE
Karl Cring Ayers and David Warren McAnaney, Chillicothe, Ohio, assignors to The Mead Corporation, Dayton, Ohio
Filed June 9, 1969, Ser. No. 831,586
Int. Cl. C02c 1/04
U.S. Cl. 210—5     9 Claims

ABSTRACT OF THE DISCLOSURE

A process for the treatment of liquid containing biodegradable organic solids, as for example, sewage, and the like, which, in general, combines desirable features of trickling filter and activated sludge systems and includes apparatus suitable therefor. A liquid containing biodegradable solids, as for example, sewage and the like is constantly recirculated from a sump or aerobic lagoon through a trickling filter, and effluent from the trickling filter is mixed with incoming raw sewage with agitation in the sump. The mixture is then retained in quiescent zones before overflow effluent is removed from the sump thus efficiently treating both settleable solids and dissolved solids contained in the sewage and the like.

BACKGROUND

The present invention relates to improved method and apparatus for the treatment of liquids containing biodegradable organic solids and, more particularly, to improved apparatus and method for efficiently reducing oxygen-consuming wastes contained in such liquids.

Heretofore, trickling filters have been employed to reduce the biological oxygen demand (BOD) of sewage effluents containing organic materials by approximately 25%. By recycling the effluent through the filter the efficiency of the operation can usually be increased to approximately 50%. When higher BOD removals are required, activated sludge process of treatment has been employed. However, as compared to the trickling filter process an activated sludge process is much more expensive to operate. Furthermore, an activated sludge process cannot withstand shock loads and requires much closer supervision.

One of the main reasons for higher efficiency of activated sludge systems is longer retention time for the sludge being treated, which is hours compared to minutes for a normal trickling filter. The present invention combines certain desirable features of these two prior processes and thereby obtains efficiencies comparable to those of the activated sludge process at a lower plant investment cost, as well as, lower operating cost. And in accordance with the present invention, both large and small volumes can be treated with comparable efficiencies by merely making appropriate changes in the sizes of the circulation and retention components such as the trickling filter, circulation pipes and pumps, and the sump.

SUMMARY

An aerobic lagoon or specially designed sump receives, via a draft tube, raw waste mixed with trickling filter effluent. Waste from the bottom of the sump is constantly recirculated through the trickling filter. Improved purification and improved efficiency of removal of settleable solids from clarified overflow effluent result from the removal of such effluent from quiescent zones provided within the said sump.

DESCRIPTION

The foregoing, as well as other objects and advantages of the present invention will become apparent from the following description in conjunction with the accompanying drawings, in which:

FIG. 1 is a sectional view of a preferred embodiment of the invention;

FIG. 2 is a schematic diagrammatic plan view of the embodiment of FIG. 1;

FIG. 3 is a schematic diagrammatic plan view illustrating a modification of the embodiment of FIG. 2;

FIG. 4 is a schematic diagrammatic plan view illustrating a further modification of the invention; and FIG. 5 is a diagrammatic view illustrative of the prior art.

Referring to FIG. 1, a tower type trickling filter 1 includes a casing of sheet metal or other suitable material and is desirably lined with a chemical-resisting material, such as polyvinyl chloride. The filter casing is filled with filter media used heretofore in trickling filters. Preferably, the trickling filter is filled with filter units each formed of a plurality of undulated sheets of plastic material separated by flat sheets of similar material to define a multiplicity of vertical flow passages, for example, as set forth in U.S. Pat. No. 3,347,381 granted Oct. 17, 1967.

Recirculated liquid carrying collected organic solids enters filter 1 from pipe 10 and is distributed over the surface of the filter media by distributor head 12. The trickling filter 1 is preferably supported by any suitable structure (not shown) which bridges sump 2 and draft tube 3 and allows effluent from the filter to be discharged into the draft tube.

Sump 2 may be of any desired cross-sectional shape (top plan), such as circular or polygonal. In order to facilitate construction and to reduce the cost thereof, the sump may be of square cross-section, and the lower portions 4 of the sides of sump 2 slope downwardly and inwardly to bottom 5 to facilitate collection of settleable material from the liquid in the sump.

Concentrated liquid and/or sludgy solids is removed from the bottom of the sump and is recirculated to the top of and through the trickling filter via conduit 10 and pump 11. The effluent discharged from the trickling filter is thoroughly mixed with raw sewage or other liquid to be treated in the draft tube.

Generally, such raw sewage or other liquid is introduced with or without prior treatment, into the draft tube via an inlet conduit 15 through which it flows under the influence of gravity, and agitation is provided to insure thorough mixing of the liquid to be treated with the contents of the sump within the draft tube and with the trickle filter discharge effluent. In accordance with the present invention, such agitation is provided by diverting a portion of the recirculated liquid from conduit 10 via branch conduit 10a and introducing such diverted portion into the central portion or mixing zone portion of the draft tube where it is discharged tangentially relative thereto.

The resultant mixture flows downwardly within the interior of the draft tube and through said mixing zone portion and into the lower portion of the sump.

Thereafter, it is desirable that agitation action be arrested and that the contents of the sump be retained in a quiescent condition for a period of time prior to the removal of clarified effluent from the sump. In accordance with the present invention, said resultant mixture is caused to flow slowly and upwardly from the lower portion of the sump to the surface of the liquid contained therein through a plurality of zones, described more particularly hereinafter, within which the liquid is retained for a desired retention period under quiescent conditions. Purified overflow effluent is collected from the surface of the liquid within said zones and is removed from the sump through an overflow pipe 13. If desired, a launder 9 may be provided in said zones near the opening of pipe 13. The draft tube 3 extends downwardly below the surface level of the liquid to the lower portion of the sump but terminates short of the bottom 5 and the sloping walls 4 thereof. The top of the draft tube extends upwardly above the surface level of the liquid contained in the sump and thus prevents incoming liquid from conduit 15 from entering directly into conduit 13 prior to treatment of such liquid within the sump.

In accord with one aspect of the invention, as illustrated in FIG. 2, sump 2 is square in plan cross-sectional shape. The outer diameter of draft tube 3 corresponds to the spacing between opposite side walls of the sump and the draft tube is disposed therein with its exterior surface tangent to the side walls of the sump. Thus, the side walls of the sump and the exterior surface of the draft tube cooperatively form four discrete passageways or zones 6 through which the liquid mixture slowly rises from the lower portion of the sump after passing downwardly through the central interior of the draft tube.

The above noted disposition of the side walls of the sump and the exterior surface of the draft tube not only defines passageways for the upward movement to the surface of the liquid from the lower portion of the sump but additionally and simultaneously arrests the agitation action provided in the interior of the draft tube. Since each zone 6 is separate and distinct from other such zones, these zones allow the slow upward movement of the liquid mixture but effectively prevent rotational movement of such liquid relative to the longitudinal axis of the draft tube around the exterior thereof during such upward movement. Thus, such slow upward movement of the liquid mixture is effected under quiescent conditions.

Similar discrete zones are provided in modified embodiments of the invention. For example, the plan cross-sectional shape of the sump may be square, rectangular, or other shape. As illustrated in FIG. 3, the sump 2a is rectangular and its longer side walls are tangent to the exterior surface of the draft tube. Baffles 7 extend between the exterior surface of the draft tube and the shorter side walls of the sump and cooperatively define therewith four discrete zones 6a each of which is substantially co-extensive with the vertical extent of the exterior surface of the draft tube. In FIG. 3, only two overflow conduits 13 are employed and a launder 9 is provided at opposite ends of the sump to collect purified overflow effluent from the surfaces of all four zones 6a.

In FIG. 4, a further modified embodiment of the invention is illustrated. In this embodiment the shapes of sump 2b as well as the launder 9a are circular in plan cross-section and one or more conduits 13 may be provided to remove purified overflow effluent from surfaces of all six zones 6b which are defined between the side wall of sump 2b and the exterior surface of draft tube 3 and between adjacent baffles 7 which extends between the sump wall and the draft tube.

It will be obvious that the basic apparatus and process may be supplemented in various ways, if desired, depending upon the results desired and the particular type of sewage or other liquid to be treated. For example, lint screens, settling tanks, comminutors, etc., may be provided ahead of the sump embodying the present invention, and/or sludge tanks, chlorinators, etc., may be provided after said sump, as desired. Additionally, the apparatus may include a branch conduit 10b for occasional removal and discharge of sludge from the sump 2 to a sewer, drying beds, etc., as well as control valve 14.

In operation, raw sewage or other liquid to be treated flows through conduit 15 into draft tube 3, with or without prior treatment, and there is mixed with effluent which falls into the draft tube as it is discharged from the trickling filter. To insure thorough mixing of the trickling filter effluent with the raw incoming sewage or other liquid, agitation is provided by that portion of the sludgy material which is drawn from the sump by pump 11 and diverted through branch conduit 10a back into the interior of the draft tube under pressure and released tangentially therein. Thus, a swirling movement is imparted to the incoming raw liquid and it becomes thoroughly mixed with the filter effluent as well as with the sludgy material. After this agitated mixture passes downwardly through the draft tube into the lower portion of the sump, it then slowly moves upwardly through the several zones 6 which arrest the agitation and the mixture continues to move upwardly under a quiescent condition favorable to sedimentation. Since the upward movement of the liquid mixture through zones 6 is quite slow, the liquid is retained therein for a substantial period of time thus providing additional time for the settling of solids and a high degree of solids removal is thus obtained. This arrangement eliminates the necessity for a subsequent settling tank.

The purified effluent is removed from the surface level of the liquid contained within each of the quiescent zones and is discharged from the sump, with or without chlorination or other treatment following its removal.

The sump is of relatively large volume to handle the desired volume of liquid to be treated. However, the sump volume is not so large that the liquid contained therein will become anaerobic. Maximum ratio of recirculation to raw feed is maintained and will depend upon organic loading and BOD reduction desired. The sump is sized to accommodate total raw feed volume and normally expected surges thereof and to provide a total retention time as required for desired stabilization.

For optimum operation the sump tank should be of sufficient capacity to give a total retention time of approximately 24 hours, with about 20–22 hours of this in the draft tube or mixing section and about .2–4 hours in the quiescent zones. A substantial retention period in the sump is desirable to allow aerobic bacteria to attack dissolved waste material in the sewage or other liquid tank to convert it to a bacterial sludgy material which tends to settle to the bottom of the sump tank prior to its being conveyed to the trickling filter for further treatment. Thus, the method and apparatus of the present invention effectively and efficiently treats both settleable and dissolved solids contained in sewage or other liquid being treated, and prevents raw incoming liquid from mixing with purified overflow effluent.

If desired, a second branch conduit 10b may be provided for the occasional removal and discharge of sludge from the apparatus, and valves 16 and 17 are provided for selectively controlling flow through conduits 10 and 10a.

What is claimed is:

1. Apparatus for the purification of liquid containing biodegradable organic matter, comprising a trickling filter, a sump for collection and storage of said degradable organic matter under treatment, pumping means for removing from the bottom of said sump a mixture of liquid and solid degradable organic matter and circulating said mixture through said trickling filter, wall means within said sump and coaxial with it extending above and substantially below the surface of said liquid within said sump and forming therein a central zone surrounded by a peripheral quiescent region, means for mixing with agitation in said central zone incoming liquid to be treated and effluent discharged from said trickling filter and conveying said agitated mixture downwardly through said central zone, means for dividing said peripheral region into a plurality of discrete zones, and means for withdrawing purified overflow effluent from the surface of said liquid within said discrete zones.

2. Apparatus according to claim 1 wherein said dividing means includes a plurality of spaced apart baffle walls each extending between said wall means and the sides of said sump.

3. Apparatus according to claim 1 wherein said wall means defines a hollow cylinder with the outer surface thereof tangent to the sides of said sump which is square in cross section.

4. Apparatus according to claim 1 wherein the aggregate volumetric capacity of said discrete zones is from about $\frac{1}{12}$ to about $\frac{1}{6}$ of the total volumetric capacity of said sump.

5. Apparatus according to claim 1 wherein said mixing means additionally includes conduit means connected to said mixture pumping and circulating means and discharging under pressure a portion of said mixture into said central zone.

6. Apparatus according to claim 5 wherein said conduit means discharges said mixture portion in a direction tangent to said wall means.

7. In a process for the purification of liquid containing degradable organic matter by feeding said material into a sump tank having wall means within it and coaxial with it extending above and substantially below the surface of said liquid within said sump tank and forming therein a central zone surrounded by a peripheral quiescent region and means for dividing said peripheral region into a plurality of discrete zones, transferring from the bottom of said sump tank to the top of a trickling filter sludge containing biodegradable organic matter, the improvement which comprises discharging effluent from said trickling filter into a central zone within said sump tank, mixing with agitation within said central zone incoming fluid biodegradable organic matter with said effluent from said trickling filter, flowing the resulting mixture downwardly through said central zone, thereafter flowing said mixture without agitation upwardly through said discrete quiescent zones, and removing purified liquid from upper portion of said quiescent zones.

8. Process according to claim 7, wherein the liquid is retained in said quiescent zones for a period of time ranging from $\frac{1}{12}$ to $\frac{1}{6}$ of the total retention time of said degradable organic matter in said sump tank.

9. Process according to claim 7, wherein said agitation in said central zone is effected by diverting and discharging under pressure into the liquid in said central zone a portion of said circulating mixture of biodegradable organic matter and effluent.

References Cited

UNITED STATES PATENTS 3,261,779    7/1966    Sullins et al. _____ 210—17X
3,291,309    12/1966    Hutchison _____ 210—261X MICHAEL ROGERS, Primary Examiner U.S. Cl. X.R.

210—14, 17, 151, 195, 262